(12) United States Patent
Koifman et al.

(10) Patent No.: US 6,917,448 B2
(45) Date of Patent: Jul. 12, 2005

(54) DOT GAIN CALIBRATION METHOD AND APPARATUS

(75) Inventors: Igal Koifman, Hadera (IL); Alex Weiss, Kadima (IL); Yaron Fisher, Ashdod (IL)

(73) Assignee: Creo IL. Ltd., Herzlia-Pituach (IL)

( * ) Notice: Subject to any disclaimer, the term of this patent is extended or adjusted under 35 U.S.C. 154(b) by 158 days.

(21) Appl. No.: 10/442,302

(22) Filed: May 21, 2003

(65) Prior Publication Data
US 2003/0217662 A1 Nov. 27, 2003

Related U.S. Application Data

(60) Provisional application No. 60/382,525, filed on May 22, 2002.

(51) Int. Cl.[7] .............................................. G06F 15/00
(52) U.S. Cl. ..................................... 358/3.21; 358/1.9
(58) Field of Search ............................... 358/1.9, 1.2, 3, 358/3.01, 3.02, 3.03, 3.06, 3.09, 3.1, 3.12, 3.23, 504, 515, 518, 521, 528, 1.1, 1.7

(56) References Cited

U.S. PATENT DOCUMENTS

| | | | | |
|---|---|---|---|---|
| 5,469,267 A | * | 11/1995 | Wang | 358/3.21 |
| 5,471,313 A | * | 11/1995 | Thieret et al. | 358/296 |
| 5,748,330 A | * | 5/1998 | Wang et al. | 358/3.21 |
| 5,953,498 A | * | 9/1999 | Samworth | 358/1.9 |
| 6,262,810 B1 | * | 7/2001 | Bloomer | 358/1.9 |
| 6,271,937 B1 | * | 8/2001 | Zuber | 358/1.9 |
| 6,396,595 B1 | * | 5/2002 | Shimazaki | 358/1.9 |
| 6,514,661 B1 | * | 2/2003 | Eyre et al. | 430/259 |
| 6,515,770 B1 | * | 2/2003 | Rao et al. | 358/3.13 |
| 6,535,307 B1 | * | 3/2003 | Allen et al. | 358/504 |
| 6,575,095 B1 | * | 6/2003 | Mahy et al. | 101/485 |
| 6,606,167 B1 | * | 8/2003 | Rees et al. | 358/1.9 |
| 2002/0012130 A1 | | 1/2002 | Bronstein et al. | |

FOREIGN PATENT DOCUMENTS

| | | |
|---|---|---|
| EP | 0735743 | 10/1996 |
| EP | 1026893 | 8/2000 |
| EP | 1149703 | 10/2001 |

* cited by examiner

*Primary Examiner*—Gabriel Garcia
(74) *Attorney, Agent, or Firm*—G.E. Ehrlich (1995) Ltd.

(57) ABSTRACT

A method for providing in use estimation of dot gain in digital printing using digital printing plates, the method comprising: applying to a digital printing plate a calibration strip, the strip comprising at least one set of patches, each patch comprising a plurality of dots at a predetermined gray level within said dynamic range, gray levels of said set of patches being distributed over said dynamic range, printing from said calibration strip under a current set of printing conditions, measuring intensities of said printing, and interpolating from said measurements to generate a curve of dot gain over said dynamic range. The curve can then be used to compensate. When moving to a different set of printing conditions, a single test print is then carried out and a new dot gain estimation is available.

10 Claims, 9 Drawing Sheets

(6 of 9 Drawing Sheet(s) Filed in Color)

DOT GAIN CALIBRATION METHOD AND APPARATUS

RELATIONSHIP TO EXISTING APPLICATIONS

The present application claims priority from U.S. Provisional Patent Application No. 60/382,525 filed May 22, 2002.

FIELD AND BACKGROUND OF THE INVENTION

The present invention relates to a dot gain calibration method and apparatus and, more particularly, but not exclusively to dot gain calibration for use with a pre-press system, press or proofing printer.

Dot gain on a printed sheet is an increase in halftone dot size in comparison with dot size on the printing plate. The magnitude of the dot gain depends on factors such as the ink absorption characteristics of the paper, the ink, the screening parameters and the press variables.

The total measured dot gain on the paper is a combination of two separate and unrelated gain factors; plate-related dot gain and press-related dot gain factors. The two gains may be dealt with in any calibrating process to compensate for the dot gain, and may be considered either separately or jointly. Plate related dot gain typically results from chemistry or from the plate exposure process. Press related dot gain, on the other hand, may result from factors such as paper type, screen frequency/geometry, solid ink density/ink characteristics, or press machine attributes such as plate to blanket pressure or blanket characteristics. The data on the plate is considered as constant, while press factors as well as paper alkali/acidity may change over time.

Plate related dot gain is conventionally corrected separately from the press related factors by using correction curves, also called ex-curves (i.e. expose curves). Press-related dot gain can subsequently be compensated for by a process known as tone reproduction.

Tone reproduction is a process in which tonal range is manipulated in order to yield aesthetically pleasing results on sprinted sheets. Target values are applied for each set of printing parameters and then compensation is made for differences between the actual, that is measured (without compensation), values and the target values (that produce the most pleasing result).

Current tone reproduction processes generally provide reasonable compensation for press-related dot gain, provided that conditions remain stable between compensation and print run.

The current workflow for building a calibrated tone reproduction curve comprises:

Using a prepress system and a CTP (Computer to Plate) or CTF (Computer to Film) machine to create dedicated four plates, one for each color, with test patterns for measurement of the dot gain for different file values for each of the four colors;

2. Loading the plates onto a press and performing a trial print run;

3. Measuring dot percentage values on the printed sheet;

4. Comparing the measured values to a set of predefined required (target) values;

5. Creating a tone reproduction curve to compensate for the differences between the required and measured values; and 6. Producing plates with the job to be printed, using the tone reproduction curve to modify the digital data.

The above cycle is very expensive and time consuming and the curve is only valid as long as conditions remain exactly the same. If a new paper stock is used, or a slightly different ink formula is placed in the machine, or different screen parameters are used (that is parameters for setting dot patterns to give the color picture) then the entire tone reproduction process has to be repeated. In order to avoid the need for carrying out such calibration, printers often try not to use new paper stock or less predicable kinds of paper such as recycled paper stock. Printers also try to avoid changing to higher quality screen sets, thus saving valuable press and make-ready time by working with familiar dot gains.

Another common technique used in press sites due to the high cost of the current calibration cycle is on-press compensation. Use of non-optimized tone reproduction curves for existing printing conditions and manual compensation of dot gain, performed on press by means of ink keys setup are common. This is a difficult and time consuming task, that becomes even more difficult and almost impossible as use of high screen ruling and FM screening gains popularity.

Even when a dot gain measurement cycle has been performed for a given paper and screen set, the validity of the tone reproduction curve is limited to a time frame, as paper and press characteristics often change over time. Likewise, other factors tend to make themselves felt such as routine replacement of the blankets on the press.

Furthermore, conventional calibration methods are manual, and therefore prone to operator mistakes. There is no closed-loop process of feed back from press to CTP (Computer to Plate) or CTF (Computer to Film) devices and therefore the accurate reproduction of color cannot be fully automated.

Other processes hindered by the complex setup workflow include remote plate-making, where the same digital data serves for manufacturing plates in different press locations and for different presses and different paper stocks. It is quite common that a print job is defined in one location and the data is then sent to a second remote location where the plate is made up and the print run is carried out. It is also quite possible for the same print job to be carried out with remotely created plates at several locations at the same time. Currently, it is difficult to make sure that the different locations accurately print the same color.

Remote preparation is very common in Gravure processes, which use copper cylinders to transfer ink to the paper. There is only a limited number of sites in the world which have the capability to make such cylinders. This requires, therefore, knowledge of printing conditions in remote sites.

A further kind of printing that is not suited to the above process is printing using direct imaging presses. Direct imaging presses use direct-imaging waterless printing plates with sets of ink for which the existing dot-gain calibrations are unsuited.

In the past, screen rulings of 153–200 lines per inch (LPI) have been used. Today, the trend is for greater densities, in the realm of 250+LPI, with dots having circumferences in the range of tens of microns. As will be appreciated, the same percentage dot gain has a greater visual effect the more densely packed are the dots, and thus effective control of dot gain is rendered more and more important.

With larger screen cells and lower screen rulings it was always possible to manipulate the press directly by operating the ink keys. However, with current trends this becomes more difficult.

It is noted that screening techniques can be divided into two. In conventional screening, known as AM, dot distribution is fixed and tones are decided by dot size, or absence of the dot altogether. The alternative is FM screening, in which the dot size is fixed, and the positioning of the dots at greater or lesser frequency is altered. Due to the non-linearity of the visual effect with dot packing, good dot gain control is especially important for FM screening.

Good control of dot gain is especially important for the commercial packaging market. Companies often rely on consumers recognizing the colors on their packaging and do not wish different batches to have different colors. Aside from the consumer issue, exact colors on packaging act as a barrier to product piracy and forgery in general, since it requires expertise and investment on the part of the forger to match colors exactly.

U.S. Pat. No. 5,748,330 to Wang, discloses a technique for calibrating the hardware and software of a digital printing apparatus, which relies on making seven component test patches which completely characterize the printing system. The technique is specific to a grid-based screening technique described in U.S. Pat. No. 5,469,267, which allows use of a function based on the Yule-Neilsen equation and is hence not of general applicability.

There is a need for a robust, automatic and generally applicable tone reproduction measurement and calibration process to overcome the disadvantages of the existing processes.

SUMMARY OF THE INVENTION

According to one aspect of the present invention there is provided a dot gain calibration system comprising:

a measurements database for including therein:

measurements of dot gain pertaining to plate and press dot gain factors for various screen parameters; and combinations between said dot gain factors and said various screen parameters;

a network for communicating data between said database, and at least one printing location;

a dot gain measurement device at said printing location and operatively associated with said network, for measuring dot gain on a printed street, and able to use said network for communicating said measured dot gain;

said system comprising a tone reproduction curve generator configured with an input to receive current printing parameters and required target values from said printing location and information from said database, therefrom to generate tone reproduction parameters to be used in printing to compensate for dot gain, said generator further comprising:

a calculation unit connected to said input for receiving said current printing parameters, said database information and said required target parameters and calculating therefrom said tone reproduction curve; and an output for receiving said tone reproduction curve and sending said calculated tone reproduction curve to said printing location.

Preferably said printing location comprises at least one of a printing press and a prepress.

Preferably, said dot gain comprises press dot gain factors, said press dot gain factors comprising at least one of:

ink type;

paper type; and press type.

Preferably, said input is configured to receive from said database measurement data for a first of said current printing parameters in combination with a third parameter; said input is further configured to obtain from said database measurement data for a second parameter of said current printing in combination with a fourth parameter; said input is further configured to obtain from said database measurement data for said third parameter in combination with said fourth parameter; and said calculating unit further comprises an extrapolation unit configured to carry out extrapolating or interpolating from said obtained measurements to obtain values predicting dot gain for said first parameter in combination with said second parameter, therefrom to generate said curve for sending to said printing location.

Preferably, said input is further configured to obtain from said database measurement data for a plurality of values of one of said current printing parameters;

and said calculating unit comprises an extrapolation unit configured for extrapolating or interpolating from said obtained measurements to obtain values predicting dot gain for said one of said current printing parameters; therefrom for generating said curve for sending to said printing locations.

According to a second aspect of the present invention there is provided a digital calibration strip for applying onto a digital printing plate representation, the strip comprising a plurality of sets of patches, each set configured by pre-screening with a respectively different screening parameter set, wherein each of said patches within each set represents a specific gray level.

According to a third aspect of the present invention there is provided a digital calibration strip for applying onto a digital printing plate representation, comprising a plurality of patches, each patch constructed from a basic shape composed of a respectively different preselected layout of laser dots.

Preferably, said basic shapes are preselected such that superposition of selected basic shapes from different ones of said plurality of patches allows simulation of any one of a range of screen parameters sets.

According to a fourth aspect of the present invention there is provided a method of in use prediction of dot gain in a scheduled printing using printing plates, the method comprising the steps of:

providing parameters of said scheduled printing including a set of required density values,; and obtaining a calibrated tone reproduction curve corresponding to said parameters, said curve indicative of compensation for dot gain.

Preferably, said scheduled printing uses a printing plate comprising a plurality of sets of patches, each set configured by pre-screening with a respectively different screening parameter set, wherein each of said patches within each set represents a specific gray level, said providing additionally comprising::

issuing a measurement request;

printing at least one test sheet using said calibration strip;

measuring said printed calibration strip; and providing said measurements for generation of said tone reproduction curve.

In the case where the scheduled printing uses a printing plate comprising a plurality of patches, each patch constructed from a basic shape composed of a respectively different preselected layout of laser dots, the method additionally comprises:

issuing a measurement request;

printing at least one test sheets using said printing plate;

measuring intensities from said printed calibration strip; and providing said measurements for generation of said tone reproduction curve.

Preferably, said providing additionally comprises:

issuing a measurement request;

printing one or more test sheets using a currently mounted printing plate comprising a calibration strip, said printing according to said scheduled printing parameters; the calibration strip comprising a plurality of sets of patches, each set configured by pre-screening with a respectively different screening parameter set, wherein each of said patches within each set represents a specific gray level, measuring intensities at said printed calibration strip; and providing said measurements for generation of said tone reproduction curve.

Preferably, said providing additionally comprises:

issuing a measurement request;

printing one or more test sheets using a currently mounted printing plate comprising a calibration strip, said printing according to said scheduled printing parameters, the calibration strip comprising a plurality of patches, each patch constructed from a basic shape composed of a respectively different preselected layout of laser dots;

measuring intensities of said printed calibration strip; and providing said measurements for generation of said tone reproduction curve.

Preferably, said scheduled printing parameters comprise any one or a combination of parameters from the group consisting of press type, paper type, ink type and screening parameters.

Preferably, said obtaining said calibrated tone reproduction curve comprises the steps of:

obtaining, from a database, measurement data for a first of said scheduled printing parameters in combination with a third parameter;

obtaining from said database measurement data for a second parameter of said scheduled printing in combination with a fourth parameter;

obtaining from said database measurement data for said third parameter in combination with said fourth parameter; and extrapolating from said obtained measurements to obtain values predicting said first parameter in combination with said second parameter.

Preferably, receiving said calibrated tone reproduction curve comprises:

obtaining from a database measurement data for a plurality of values of one of said current printing parameters; and extrapolating or interpolating from said obtained measurements to obtain values predicting dot gain for said one of said current printing parameters.

Preferably, receiving said calibrated tone reproduction curve comprises extrapolating or interpolating from said measured parameters to obtain values predicting dot gain for said one of said current printing parameters.

Preferably, said step of producing said calibrated tone reproduction curve comprises superpositioning said basic shapes into shapes representative of said current printing parameters, therefrom to obtain values predicting dot gain for said current printing parameter.

Preferably, said providing parameters comprises searching a database to determine the presence of dot gain compensation data corresponding to said provided parameters, using said compensation data to obtain said tone reproduction curve if found, otherwise:

obtaining intensity measurements from printing of a calibration strip, and using said intensity measurements to obtain said tone reproduction curve The digital calibration strip may additionally comprising a barcode.

The barcode may comprise identification data for at least one of the group consisting of platesetter, printing parameters, press and dot gain.

Preferably, the database additionally comprises information defining a press format.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

The file of this patent contains at least one drawing executed in color. Copies of this patent with color drawing(s) will be provided by the Patent and Trademark Office upon request and payment of the necessary fee.

DESCRIPTION OF THE PREFERRED EMBODIMENTS

The present embodiments disclose a system for dot gain calibration which is easy to carry out and therefore suitable for closed loop implementation, including scenarios in which parts of the print process are carried out remotely from each other. The system involves the incorporation onto the printing plate of a calibration strip. The content of the strip is standard, so that color measurements carried out on paper printed from the calibration strip indicate the dot gain under the current print conditions.

The principles and operation of a dot gain calibration method and apparatus according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
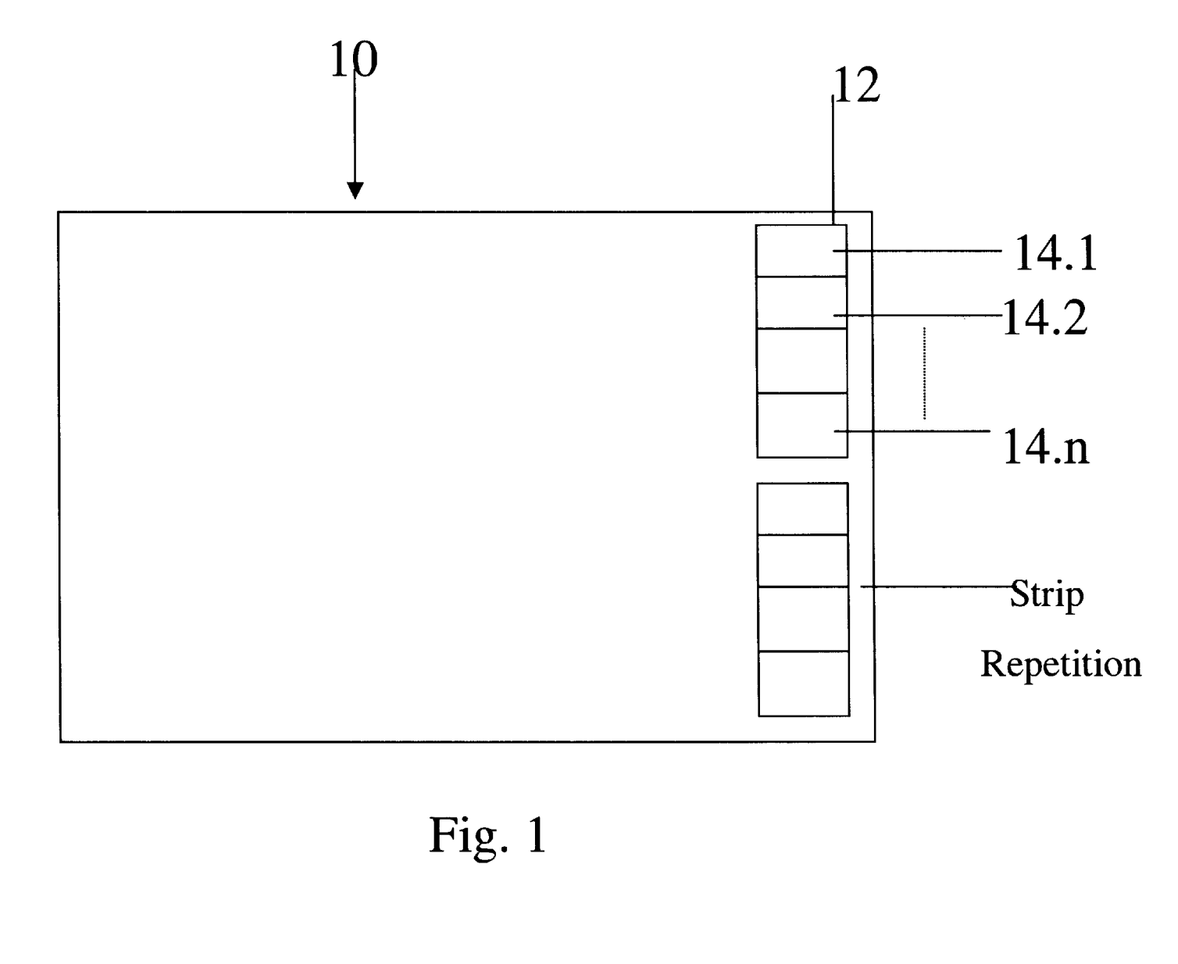
FIG. 1 is a simplified diagram illustrating a printing plate with a calibration strip according to a preferred embodiment of the present invention.

Referring now to the drawings, FIG. 1 is a schematic diagram illustrating a digital printing plate 10, as typically used in three or four-color printing. The plate prints one of the colors and has a dynamic range of gray levels or intensities.

As discussed in the background, the tone levels may not be accurately reproduced on the printing plate due to plate-related dot gain issues. As a separate issue, application of the plate to any given press, using any given paper and ink may introduce further variation in the resulting tone level. To this end, a calibration strip 12 is added to the plate. The calibration strip of the present embodiments, as will be later described in detail, comprises one or more sets of patches 14.1 ... 14.n. Each patch contains a predetermined tone level, so that the entire set of patches gives a set of samples over the dynamic range. It will be appreciated that a given tone level Is achieved by a certain concentration of dots. The plate currently mounted on the press can then be test printed under any giver printing conditions and the printed results can be compared with the intended intensities, to give an accurate measure of the current dot gain specific to those requirements. The result thus takes into account all causes of dot gain. The press can then be adjusted to compensate for the measured dot gain.

Figure 2:
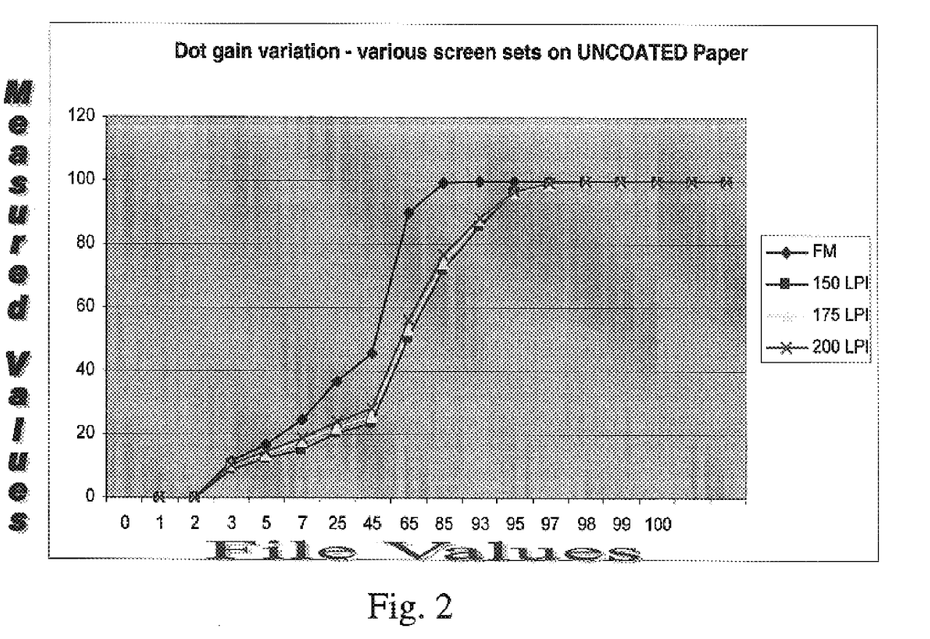
FIG. 2 is a simplified chart showing an example of dot gain behavior characteristics for different screen set parameters.

Reference is now made to FIG. 2, which is a graph showing typical dot gain against intensity characteristics under different printing conditions or screen sets, specifically FM, 150 lines per inch, 175 lines per inch and 200 lines per inch. It will be noted that the curves are far from linear and preferably the tone levels chosen for the strip are selected both to span the dynamic range and to effectively cover the areas of non-linearity, that is to say the tone levels are selected, taking into account non-linear characteristics of the dot gain, so that interpolation between measurements taken from the patches gives accurate coverage over the dynamic range. The curves effectively consist of three different, almost linear slopes, with curved sections where the linear sections join. Obviously, the more patches are used the more accurate is the interpolation, but a sufficient description may be obtained from a relatively small number of points that describe the slopes of the linear sections and indicate the curvature at the joins.

As will be explained in greater detail below, some printers may restrict themselves to a limited number of screen sets. In such a case, the best way to generate a calibration strip according to the present embodiments is to use a different set of patches for each screen set. Other printers may not be so restricted. In such a case, a general-purpose calibration strip may be constructed by using patches of a given gray level, constructed not out of conventional dots but out of basic shapes. The shapes are selected to be superimposable, to provide any set of screen parameters The plate is printed and the resulting print is scanned into a computer, which carries out the superposition to determine the density for the desired screen parameters.

Figure 3:
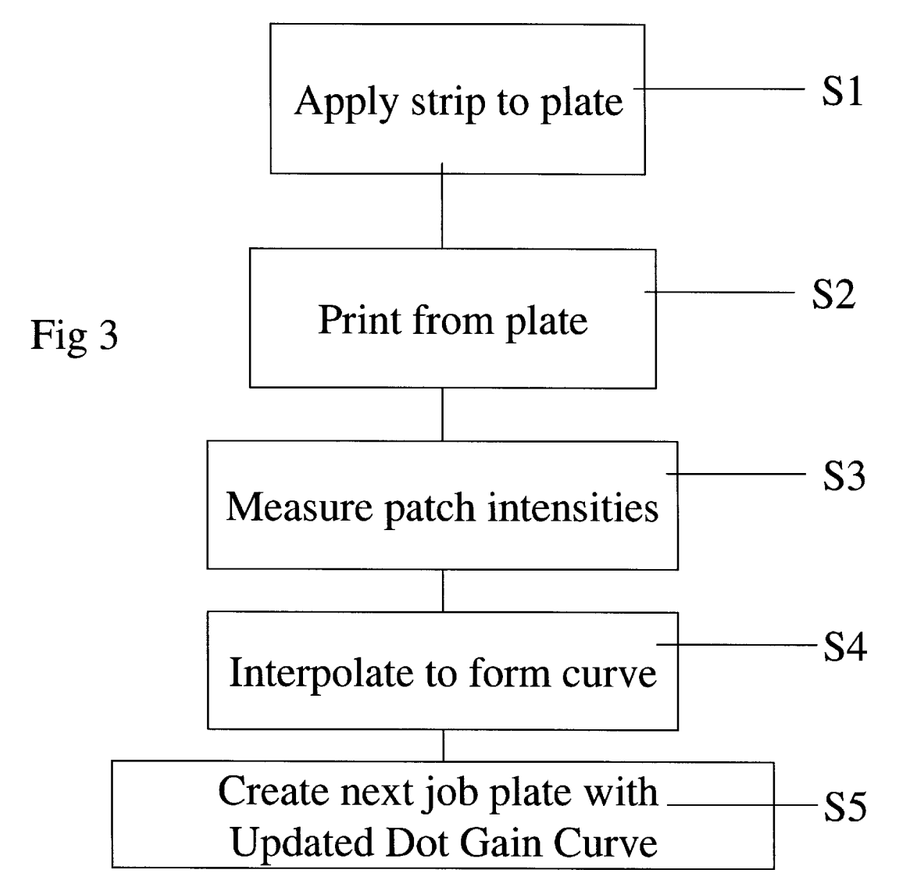
FIG. 3 is a flow chart illustrating the steps in use of a calibration strip according to the present invention to obtain dot gain curves and compensation parameters.

Reference is now made to FIG. 3, which is a simplified diagram illustrating the procedure for producing and subsequently using a calibration strip as described above. The method comprises a stage S1 of applying a calibration strip as described above to a printing plate. As explained, the strip comprises one or more sets of patches, and each patch has a plurality of dots set to a predetermined tone level within the dynamic range of the intended printing intensity. The strip is then used in a stage S2 to print from the plate under a given set of printing conditions, upon the server's request, in case it cannot provide a predicted tone reproduction curve from existing data in the database. The set of conditions may include a given ink, a given paper type and a given press. In a stage S3, the resultant printed page is measured for intensities at each of the patches on the strip. In a stage S4 an interpolation is carried out to produce a continuous dot gain curve of the kind shown in FIG. 2. The curve preferably covers the entire dynamic range of interest. In a stage S5, the curve produced is used to derive compensation parameters for printing.

As will be appreciated, the correct tone is most important in color printing. Color printing is generally carried out using separate plates for each printing color, and in such a case the method comprises applying a calibration strip to each plate.

In many cases, several presses are used to print the same material. The presses may be at the same location or may be remote from each other. Each press is likely to have different dot gain characteristics at any given time and if each press is to produce identical output, the different dot gains much each be compensated for. The use of a standardized strip for each plate according to the above embodiments, allows the correct compensation at each location to give a uniform result.

The system and method of the present embodiments may be advantageously used to predict dot gain, by interpolating data residing in the dot gain database. For example:

a. If one of the screen parameters, say the mesh, of the required print is different from that in data currently held in the database, a prediction of the dot gain for the new mesh may be done by interpolating/extrapolating between, say, three existing database samples for varying values of mesh, with other parameters being equal. Similarly, a prediction may be made for a different screen angle or dot shape. If the calibration strip used comprises basic shapes, as mentioned above, prediction may be carried out by superimposing the various basic shapes to create the required screen cell shapes.

b. If prediction is required for different printing conditions, such as different press, paper or ink, possibly also including changes in screen parameters, existing database measurements may similarly be used. For example, if the combination of Press2 and Paper2 is new, prediction may be carried out by using previous database data for the same Press2 with a different Paper1, data for another Press1 with Paper1 and data for Press1 with paper2.

A preferred embodiment of the present invention provides an automatic tone reproduction calibration process based on the standardized strip described above. The strip is incorporated in each printing plate, and an online intensity or dot % measuring device is used to determine the intensity actually produced by printing any given patch of the strip. In the online version, the results are connected to a dot gain database which, for example, stores information regarding the given plate.

The use of the database allows for ongoing measurement of the dot gain for each print job and allows a history to be built up for the plate, as well as data to be available concerning different batches of paper or different machines.

Preferably the measurement strip is incorporated in every plate by the DFE (Digital front End) or CTP device. The strip may take on one of two forms, depending on the way that the individual printing entity uses screen sets. Some printing entity for example may use only a limited range of screen sets whereas others may use a much wider or unlimited range.

Figures 4, 5:
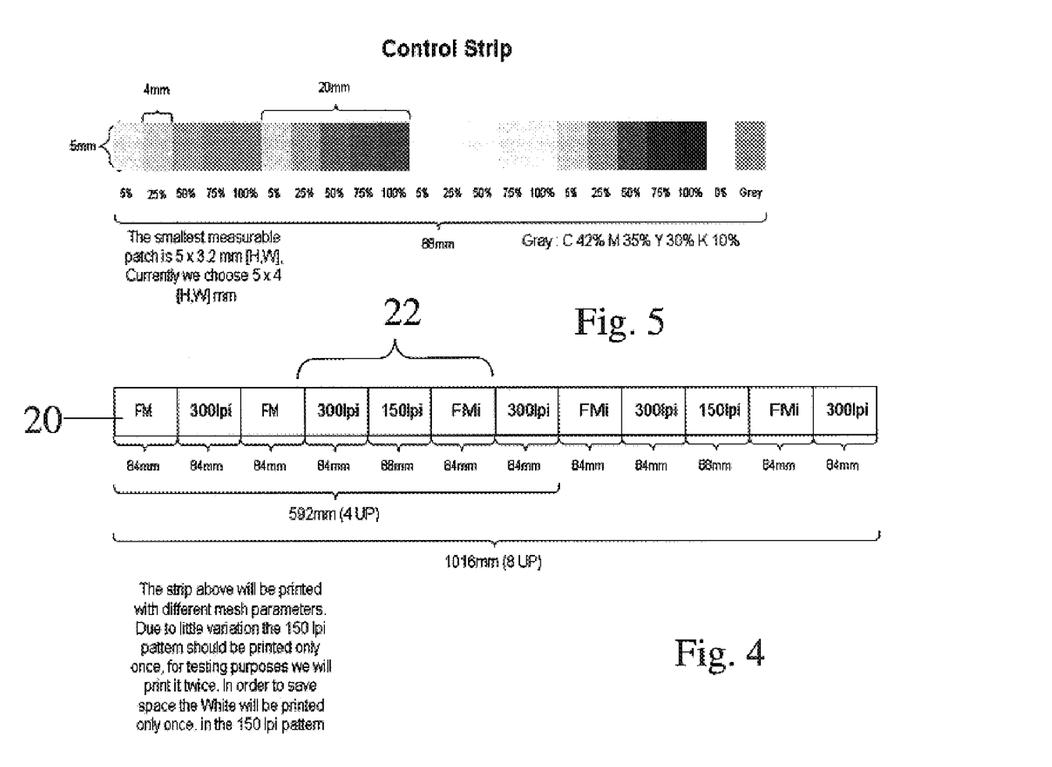
FIG. 4 is a schematic diagram showing a calibration strip layout for three predefined screen sets, according to a preferred embodiment of the present invention.
FIG. 5 is an example showing sets of test patches for one screen set with 4 separations.

1. If a limited number of screen sets, typically two or three, are used by the given printing entity, the new strip is composed of samples of all the screen sets that the entity uses. The strip is digitally screened before incorporation into the digital plate data and thus is not influenced by the current screening process. Reference is now made to FIG. 4 which is a schematic diagram of a control strip 20 applied to a plate. The control strip 20 comprises sets 22 of three patches, each patch in the set having the same tone level but for a different screen set. The screen parameters illustrated are FM, 300 lpi, and 150 lpi.

2. For wider range or unlimited use, the new strip comprises a prescreened set of basic screen dots that can then be used to extrapolate the values of the predicted dot gain for any screen set. The strip includes patches of basic shapes and sizes, which enable the calculation of predicted dot gain for many combinations of press, press setup, paper and ink. The prediction is done by measuring the dot gain on the printed strip shapes, and carrying out superposition of the basic shapes to achieve the actual dot structures under the present set of screen characteristics. The superposition process is discussed in greater detail below and is based on the principle that any shape can be achieved by superposition of underlying basic shapes.

In a preferred embodiments a barcode may be integrated into the new dot gain measurement strips, to enable automatic identification of the strip type or of the individual plate, as desired. Such an implementation requires additional reading means, such as a camera or barcode reader, for reading the barcode. The barcode is useful in conjunction with the online database described above, so that the source of data stored in the database can be identified.

Dot % Measuring Device

The dot % measuring device used with the present embodiments may be any device capable of measuring reflected light from a printed page. One possibility is to use a scanning densitometer device. Such a device is preferably capable of measuring the dot % for each patch of the dot gain strip. The digital value identifying each patch may then be linked to the measured reflectivity from a given patch. If the device is online then the result may be sent automatically to the Dot Gain Database.

A convenient alternative for the dot % measuring device is a Pressman densitometer, which may be either a table integral or stand-alone densitometer device as available in the pressroom.

Dot Gain Database

A database may be provided with the preferred embodiments. The database preferably resides on a server, to be accessible, typically via a network, to both prepress and press control units. The database may hold any information deemed relevant to the dot gain issue, including dot gain characteristics, target values and actual achieved outputs—that is dot gain values with non-compensated plates.

Obtained dot gain characteristics may be in the form of measured dot gain values or curves of dot gain, for various combinations of press, paper, ink and screening parameters. The database may be continuously updated with new values or curves every time measurements are submitted.

Predefined target or required values may be defined for various paper types or screen methods, and actual final output results may include additional details describing the dominant tone level—with respect to details in the reproduction.

As well as the database itself, there may be made available on line analyzing and reporting tools. The package of dot % measuring device, database and stools can provide a dot gain control tool.

An advantage of using a Dot Gain database to hold data of the kind described above in relation to press-related information needed for the prepress, is that it can eliminate any dependency between the prepress site location or CTP equipment type and the pressroom.

Measurement Procedure of Dot Gain for the Next Job

Using either of the new control strip configurations described above, and the dot gain database, the process of dot gain calibration according to the present embodiments is now described in greater detail.

Firstly it is necessary to decide whether a new dot gain measurement is required. Such a measurement is needed when any dot gain critical parameter is changed, for example due to a different paper stock/surface finish.

At the end of the present print job run, with the present job plates still mounted on the press, the press is set-up for the new paper stock (Changes being mainly to nip pressure between blanket and impression cylinder, and general ink consumption) and a small number of initial prints are made, until the press reaches the required solid ink density.

Each printed result includes a dot gain strip. The printed result, from a color stable printing, is measured for color density and dot % over the strip.

If the first type of control strip, that is with two or three screen sets, has been used, then the density measurements are taken from patches of the appropriate screen set in the control strip (that is—the screen set which will be used to print a job on the new paper stock) and extrapolation is carried out to provide a curve to serve as a prediction for the dot gain of the next print job using the new paper stock.

If the second type of control strip was used, the basic dot shapes are measured
for dot gain, from which computerized superimposition as described hereinbelow, is used. The superimposition is used as the basis for the curve, which may then provide a prediction for any screen-set to be used.

The measured results are saved in the Database.

The prepress side of the workflow process operates as follows:

Firstly—before a set of plates is submitted for a specific job, the prepress operator defines screen parameters, paper type control strip file type, and the target required values that are needed. The above are usually defined or requested by the final customer, and reflect his preferences for sharpness, contrast, etc. The prepress operator also defines the press that is to execute the printing.

The DFE then sends a request to the DotGain Database for an appropriate Tone Reproduction curve.

The database obtains or creates the requested curve, if the necessary data exists and is valid. If the data is not available the database preferably sends a request to the pressroom to perform the dot gain measurement procedure on the requested press. It is pointed out that the data available in the database need not be that relating to the precise parameters being defined. It is enough if parameters are available to extrapolate from similar cases as described above.

Optimum tone reproduction in offset printing requires the calculation of target values according to the following criteria:

1. Preserving the natural ratio between high lights, midtones and shadow detail;
2. Smooth tone transitions (referred to above as "tone gradation" in the); and
3. Maximum detail emphasis over the extremes: highlight and shadow areas.

Long Term Dot Gain Variation

Equipment deteriorates over time, and printing presses and printing plates are no exception. Thus if data were simply to be obtained and stored indefinitely, inaccuracies would be expected. Rather, long-term validity of the dot gain database is preferably maintained by performing scheduled measurements of the dot gain for each press, regardless of changes in paper, ink or screen parameters. The dot gain database is then automatically updated so that only most recent dot gain values are used. Regular updating minimizes remake cycles or matching problems between two runs of the same job.

Example Process Flow for Generating a One to Three Parameter Strip

In the following an exemplary process flow is given for generating a calibration strip for one to three screen set parameters:

1. The strip to be generated predicts a tone reproduction curve of a certain screen frequency/angle based on measurements of printed samples with the same conditions but with different screen frequency or different dot shapes. The scenario can be expanded to any other factor in the screening process (i.e. dot shape, D-ratio etc.). Such corresponds to the limited screen parameters scenario discussed above.

a. A typical behavior of the dot gain is shown in FIG. 2 to which reference is again made.

b. A first objective is to find the patch-percentage which best represents the dot gain across the dynamic range.

c. From the chart exemplified by FIG. 2, which shows curves for several screen frequencies, it is possible to build a mathematical transformation between screen frequencies whilst press parameters remain unchanged.

d. A first test is carried out using 5 specific gray level or intensity points (5,25,50,75,100) and each one of them is likely to be provided with a different algorithm to interpolate from one set of screen frequencies to another.

e. There is a possibility that the initial set of 5 sampling points does not lead to satisfactory results. In this case there remain two options:

(a) choose another set of sampling points of the same size (for example 5,103 25,65,100).

(b) Expand the sampling rate, i.e. 5, 10, 25, 50, 75, 90, 100 so as better to cover the whole range. Such an expansion dictates a bigger control strip, which raises problems of space on the printed sheet and additionally or alternatively may reduce dramatically the ability to measure consistency across the printed sheet.

f. The strip preferably also includes a Gray patch (CMYK overprint)—see FIG. 4, to indicate changes of hue resulting from other press related phenomenon such as:
   1. Registration shifts,
   2. Substrate color,
   3. Ink spectral absorbance inconsistencies.

g. A strip is now constricted along the lines shown in FIG. 4 for the screen parameters of interest. It is necessary to take certain considerations into account when determining the size of patches, such as: measurement device aperture, sufficient dot gain sampling, pattern repeatability (pattern repeatability is preferably as large as possible to indicate variation in ink keys and across the plate) and minimum area consumption of the printed sheet.

h. The control strip is preferably able to indicate nip pressure, solid ink density, ink-water balance, drying/trapping, and registration, as well as dot gain.

i. In addition to measuring printed intensities, another possibility for determining dot gain is to relate to the circumference of the dot. Using the screen line measurements it is possible to calculate the circumference by measuring the actual dot and applying standard geometry. The circumference of the dot is then used to describe dot gain behavior.

In the following, a process flow is given for generating a strip for an unlimited range of screen parameters.

The strip for unlimited screen parameters predicts a tone reproduction curve using on a certain dot shape and mesh or screen ruling based on measurements of printed samples with a set of basic shapes, and the subsequent superimposition of the shapes to obtain any desired dot shape. Preferably the process characterizes the behavior of ink-on-paper.

Dot gain prediction using superposition is described below, based on the assumption that any screen cell may be constructed by means of superposition of a suitable core element and a set of other basic shapes providing a constrained contour around the core. Then by measuring the actual dot gain for each of these basic elements, i.e. the core and the shapes that constrain the contour, the dot gain for the specific shape/screen cell can be predicted by mathematical calculations describing the growth factor for each element and overlapping between them.

Figure 6:
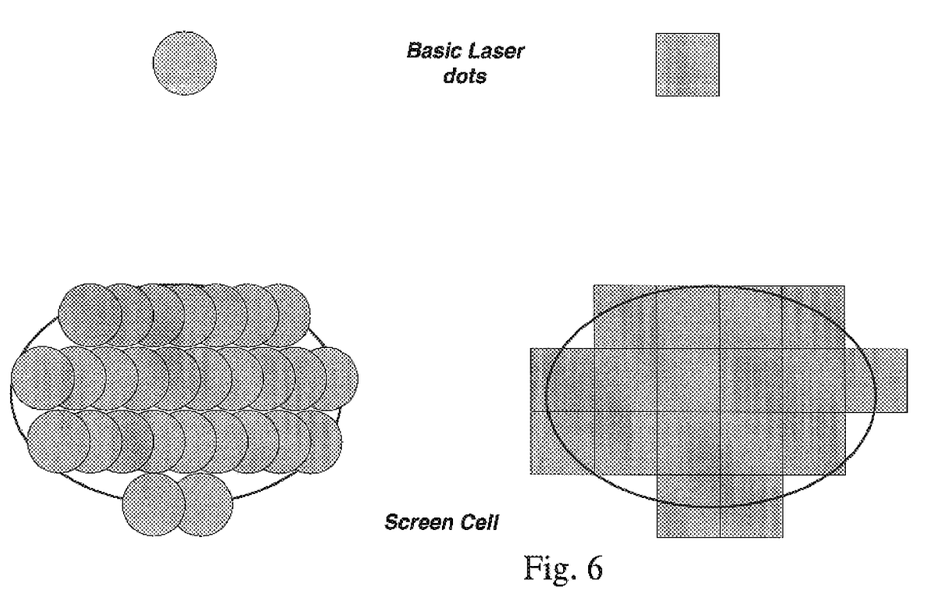
FIG. 6 is a schematic diagram showing basic laser dots and how they may be used to construct a screen cell according to the current screen parameters.

Reference is now made to FIG. 6, which shows side by side two basic shapes, a dot and a square, and below each a screen cell constructed from the respective basic shapes. CTP or CTF output devices (plotters) use laser to produce small dots on the media by means of photo or thermal effects. The dots are the basic laser dots. The screen cell is produced from a number of these basic laser dots. The basic dot size and shape depends on the resolution and imaging optics of the output device. For example, a typical CTP device uses 2540 dpi (100 dpm) resolution, and 10 microns basic laser dot size with a round or square shape as FIG. 6.

A set of basic shapes, which includes a number of core elements, and a further set of elements from which the contour of the cell can be constructed, are then included in the test patches on the strip. Each patch of the strip contains only one type of basic element.

The patches are printed and measured in dot % units, and the measurement gives a growth factor for each element or Dot Gain factor.

Figure 7:
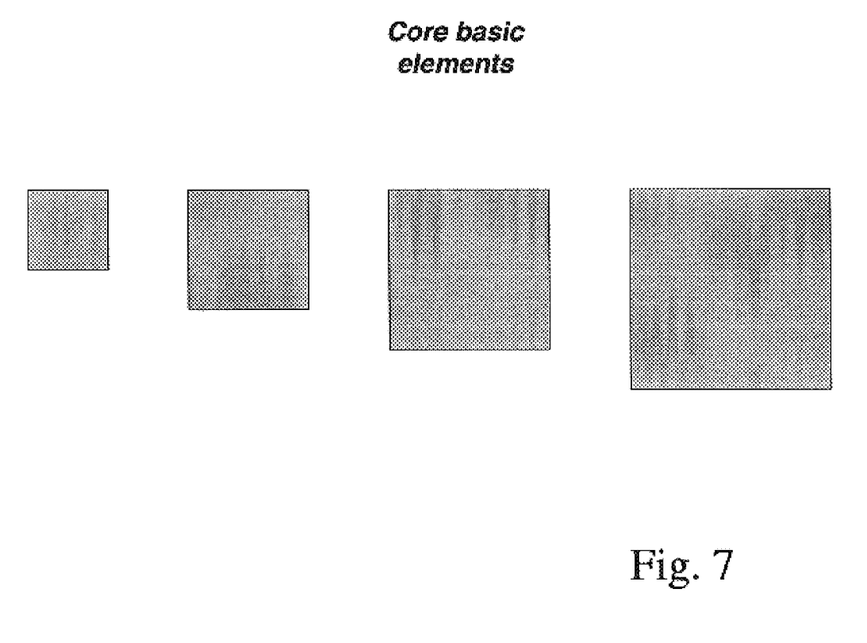
FIG. 7 is a schematic diagram illustrating core basic elements that can be included on a strip to superimpose into different screen sets.
Figure 8:
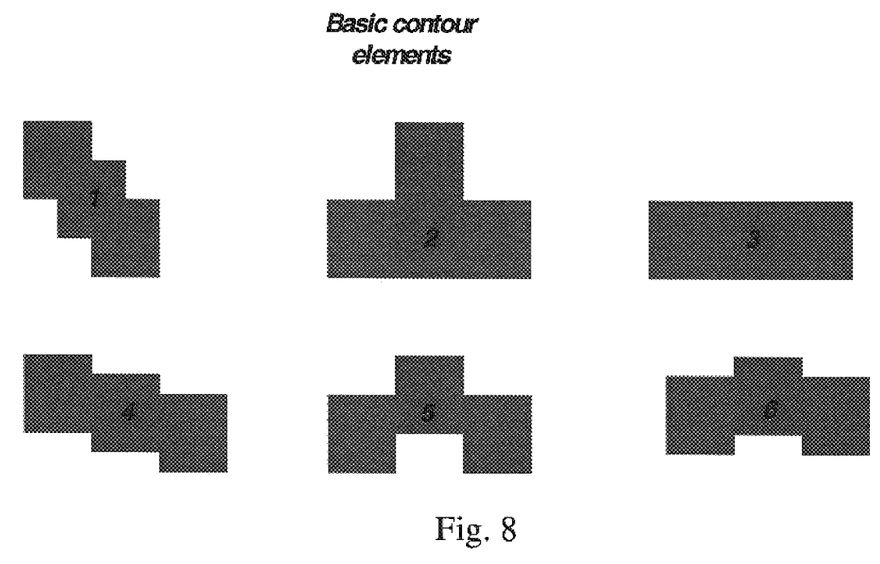
FIG. 8 is a schematic diagram illustrating contour elements that can be included on a strip to be superimposed, together with the core basic elements of FIG. 7, into different screen sets.
Figure 9:
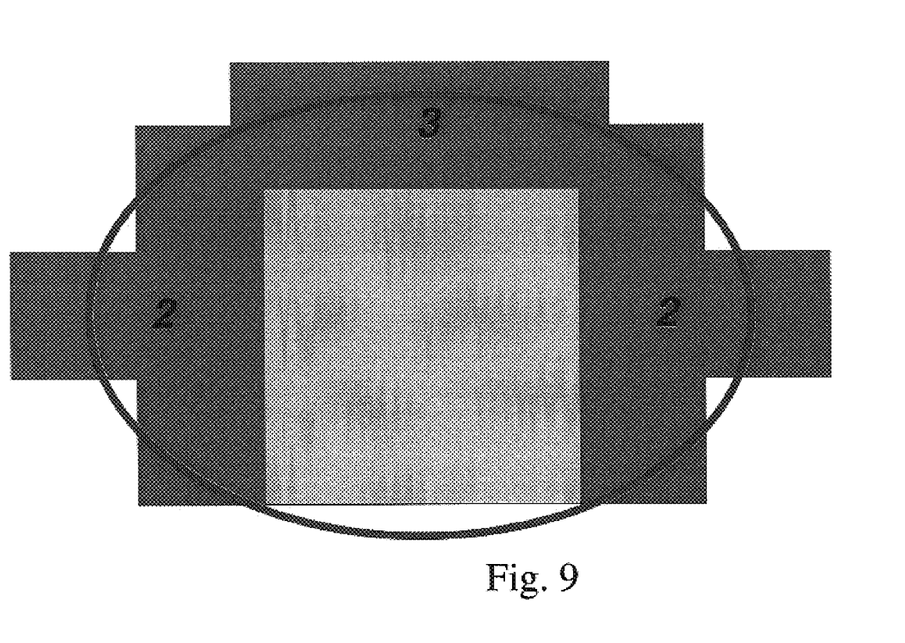
FIG. 9 is a schematic diagram illustrating the superposition of the elements of FIG. 7 and FIG. 8 into a screen cell of a desired screen set and showing a perceived screen cell contour.

For each density level of the required screen set, that is the set which defines the screen cell size and shape, a superposition scenario involving a core, contour set of basic elements and their position and overlap relations, is defined by a mathematical module. Construction of the scenario preferably involves superimposing the available elements until elements representative of the desired screen set have been constructed. FIG. 7 shows a set of typical core basic elements. FIG. 8 shows basic contour elements. FIG. 9 shows a typical superposition of the elements of FIGS. 7 and 8 to form such a screen set scenario. The bold line defines the perceived contour of the screen cell.

Figure 10:
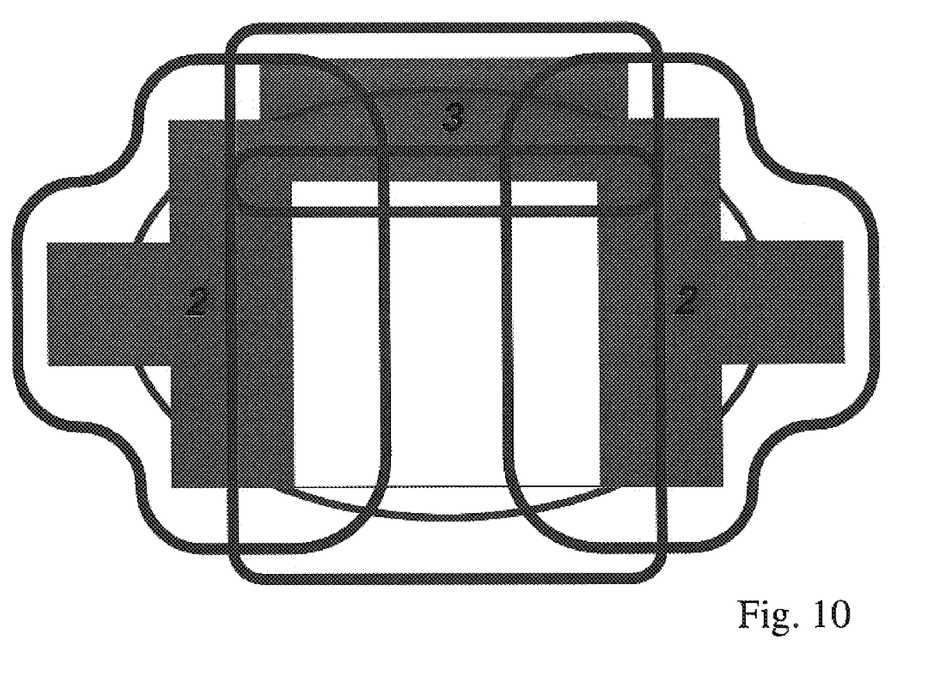
FIG. 10 is a schematic diagram illustrating the application of individual element growth as measured to the superposition of FIG. 9 in order to obtain a new contour representing the dot gain under the new screen set parameters.

Now, with the scenario described in FIG. 9 and the dot gain known for each of the elements used, a total growth factor or total Dot Gain for all screen cells may be calculated, as illustrated in FIG. 10, to which reference is now made.

FIG. 10 is a simplified diagram illustrating the effect of dot gain on the superimposed screen element of FIG. 9, and shows the application of individual element growth as measured to the superposition of FIG. 9 in order to arrive at a new contour representing the dot gain under the new screen set parameters. Dot gain involves expansion or growth of the constituent elements. The individual elements in the superposition grow in a way that has already been measured directly from the printing of the calibration strip. The growth is indicated by the bold lines drawn around each of the separate elements. An outer contour can then be drawn by connecting outer sections of the bold line. The outer contour represents the growth of the overall element.

In the above it is assumed that circumferential behavior is mainly responsible for dot gain effects and area/circumference ratio effects provide at most a second-degree factor.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of providing in use prediction of dot gain in a scheduled printing using printing plates, the method comprising the steps of:

providing parameters of said scheduled printing including a set of required density values; and obtaining a calibrated tone reproduction curve corresponding to said parameters, said curve indicative of compensation for dot gain, wherein said scheduled printing uses a printing plate comprising a calibration strip, said calibration strip comprising a plurality of sets of patches, each set configured by pre-screening with a respectively different screening parameter set, wherein each of said patches within each set represents a specific gray level, said step of providing additionally comprising:

issuing a measurement request;

printing at least one test sheet using said calibration strip;

measuring said printed calibration strip; and providing said measurements for generation of said calibrated tone reproduction curve.

2. The method of claim 1, wherein said obtaining said calibrated tone reproduction curve comprises the steps of:

obtaining, from a database, measurement data for a first of said scheduled printing parameters in combination with a third parameter;

obtaining, from said database, measurement data for a second parameter of said scheduled printing in combination with a fourth parameter;

obtaining, from said database, measurement data for said third parameter in combination with said fourth parameter; and extrapolating or interpolating from said obtained measurements to obtain values predicting said first parameter in combination with said second parameter.

3. The method of claim 1, wherein said obtaining said calibrated tone reproduction curve comprises:

obtaining, from a database, measurement data for a plurality of values of one of said scheduled printing parameters; and extrapolating or interpolating from said obtained measurements to obtain values predicting dot gain for said one of said scheduled printing parameters.

4. The method of claim 1, wherein said obtaining said calibrated tone reproduction curve comprises extrapolating or interpolating from said measured intensities to obtain values predicting dot gain for said scheduled printing parameters.

5. A method of providing in use prediction of dot gain in a scheduled printing using printing plates, the method comprising the steps of:
providing parameters of said scheduled printing including a set of required density values; and
obtaining a calibrated tone reproduction curve corresponding to said parameters, said curve indicative of compensation for dot gain, said scheduled printing using a printing plate comprising a calibration strip, said calibration strip comprising a plurality of patches, each patch constructed from a basic shape composed of a respectively different pre-selected layout of laser dots, wherein said step of providing additionally comprises:
issuing a measurement request;
printing at least one test sheet using said printing plate;
measuring intensities from said printed calibration strip; and
providing said measurements for generation of said calibrated tone reproduction curve.

6. The method of claim 5, wherein said step of producing said calibrated tone reproduction curve comprises superpositioning said basic shapes into shapes representative of said scheduled printing parameters, therefrom to obtain values predicting dot gain for said scheduled printing parameters.

7. A method of providing in use prediction of dot gain in a scheduled printing using printing plates, the method comprising the steps of:
providing parameters of said scheduled printing including a set of required density values; and
obtaining a calibrated tone reproduction curve corresponding to said parameters, said curve indicative of compensation for dot gain, wherein said step of providing additionally comprises:
issuing a measurement request;
printing one or more test sheets using a currently mounted printing plate comprising a calibration strip, said printing according to said scheduled printing parameters; the calibration strip comprising a plurality of sets of patches, each set configured by pre-screening with a respectively different screening parameter set, wherein each of said patches within each set represents a specific gray level;
measuring intensities at said printed calibration strip; and
providing said measurements for generation of said calibrated tone reproduction curve.

8. A method of providing in use prediction of dot gain in a scheduled printing using printing plates, the method comprising the steps of:
providing parameters of said scheduled printing including a set of required density values; and
obtaining a calibrated tone reproduction curve corresponding to said parameters, said curve indicative of compensation for dot gain, wherein said step of providing additionally comprises:
issuing a measurement request;
printing one or more test sheets using a currently mounted printing plate comprising a calibration strip, said printing according to said scheduled printing parameters, the calibration strip comprising a plurality of patches, each patch constructed from a basic shape composed of a respectively different pre-selected layout of laser dots;
measuring intensities of said printed calibration strip; and
providing said measurements for generation of said calibrated tone reproduction curve.

9. A method of providing in use prediction of dot gain in a scheduled printing using printing plates, the method comprising the steps of:
providing parameters of said scheduled printing including a set of required density values; and
obtaining a calibrated tone reproduction curve corresponding to said parameters, said curve indicative of compensation for dot gain, wherein said scheduled printing uses a printing plate comprising a calibration strip and wherein said scheduled printing parameters comprise any combination of parameters from the group consisting of press type, paper type, ink type and screening parameters.

10. A method of providing in use prediction of dot gain in a scheduled printing using printing plates, the method comprising the steps of:
providing parameters of said scheduled printing including a set of required density values; and
obtaining a calibrated tone reproduction curve corresponding to said parameters, said curve indicative of compensation for dot gain, wherein said step of providing parameters comprises searching a database to determine the presence of dot gain compensation data corresponding to said provided parameters,
using said compensation data to obtain said tone reproduction curve if found, otherwise:
obtaining intensity measurements from printing of a calibration strip, and
using said intensity measurements to obtain said calibrated tone reproduction curve.

* * * * *